United States Patent
Milovich

[15] 3,686,787
[45] Aug. 22, 1972

[54] FISHING TACKLE

[72] Inventor: Walter E. Milovich, South Bend, Ind.

[73] Assignee: Ace Tool Engineeting Co., Inc., South Bend, Ind.

[22] Filed: Sept. 14, 1970

[21] Appl. No.: 71,907

[52] U.S. Cl. ..................43/44.9, 43/17.5, 43/41.2
[51] Int. Cl. ..............................A01k 93/00
[58] Field of Search..........43/44.9, 41.2, 44.87, 17.5

[56] References Cited

UNITED STATES PATENTS

| | | | |
|---|---|---|---|
| 2,292,743 | 8/1942 | Cordry | 43/41.2 |
| 2,566,612 | 9/1951 | Hearne | 43/44.9 |
| 2,741,864 | 4/1956 | Shotton | 43/44.9 |
| 2,554,318 | 5/1951 | Wardrip et al. | 43/41.2 |

*Primary Examiner*—Samuel Koren
*Assistant Examiner*—Daniel J. Leach
*Attorney*—Oltsch & Knoblock

[57] ABSTRACT

Fishing tackle having a buoyant body formed from upper and lower molded parts assembled to define a sealed annular chamber within said upper part and a vertical central pocket open at its lower end and spanned at its top by a wall having a line receiving aperture. The lower part has a plurality of longitudinal ribs to provide greater weight at the lower part of the body than at the top part.

7 Claims, 7 Drawing Figures

PATENTED AUG 29 1972 3,686,787
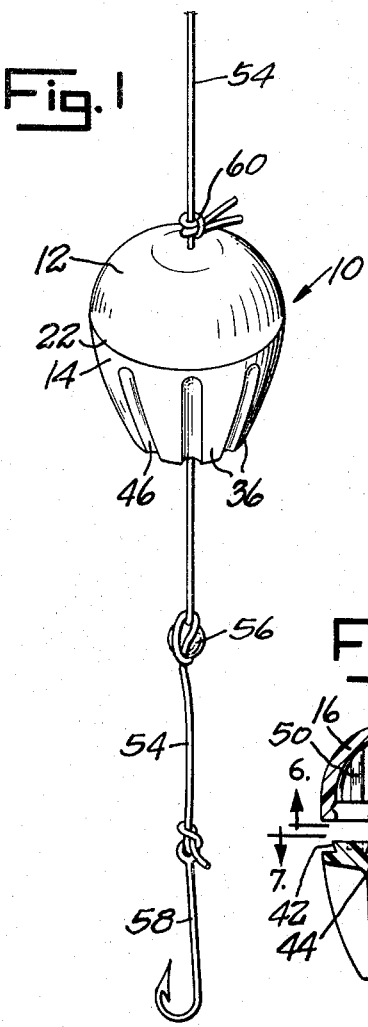
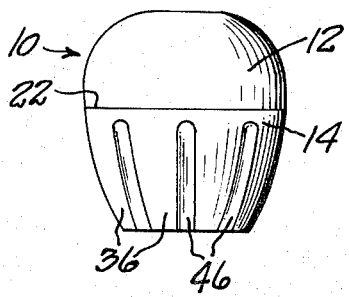
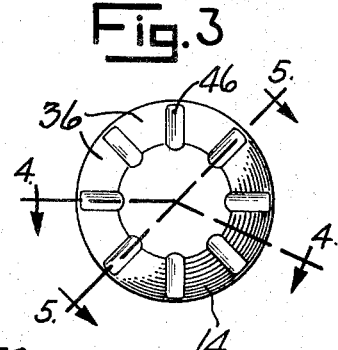
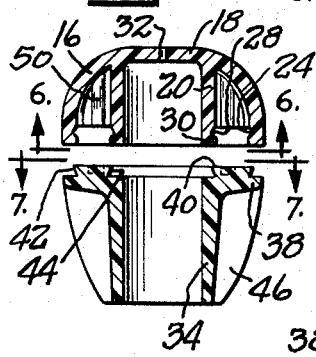
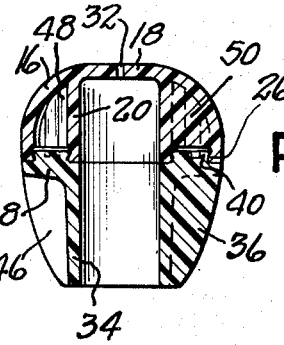
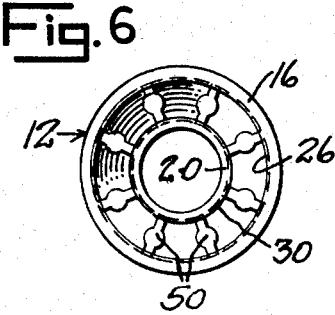
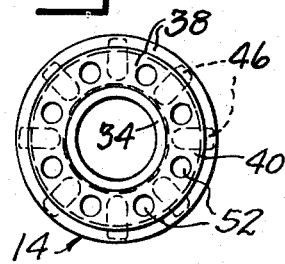
INVENTOR
WALTER E. MILOVICH
BY Oltsch + Knoblock
ATTORNEYS

FISHING TACKLE

This invention relates to improvements in fishing tackle, and more particularly to a fishing bobber.

Sport fishermen commonly use bobbers on fishing lines as a means to signal the strike of a fish. Bobbers have been constructed of many different materials and in many different shapes and configurations, and have been of varying degrees of effectiveness and utility. Commonly bobbers are formed in part at least of a buoyant material, such as cork, and have been subject to various conditions which have limited their use and utility, such as fragile character subject to breakage, low visibility in use, expensive construction and fabrication, utility in certain types of fishing only, lack of stability in the water, liability to become caught on weeds or underwater obstacles, and limited freedom for line manipulation.

It is the primary object of this invention to provide an item of fishing tackle which overcomes the limitations and disadvantages of prior fishing tackle aforementioned.

A further object is to provide an inexpensive, durable item of fishing tackle which is easily molded and rapidly assembled.

A further object is to provide an item of fishing tackle formed of two molded parts having a snap fit interconnection to accommodate rapid and accurate assembly thereof.

A further object is to provide a buoyant article of fishing tackle having a thin top wall spanning the upper end of an upright pocket of a diameter large enough to receive a fish hook, which wall is easily perforated at any selected location to accommodate passage of fishing line therethrough.

A further object is to provide an item of fishing tackle having a distinctive coloration at a normally visible part thereof which is assembled with another component having a different appearance and configuration.

A further object is to provide a device of this character which has a chambered upper part assembled with a ribbed solid lower part to provide a weight differential and difference in buoyancy at different parts thereof, said item of fishing tackle being of any selected weight, and of assured strength, and of a tapered or streamlined shape.

Other objects will be apparent from the following specification.

In the drawing:

FIG. 1 is a perspective view of the item of fishing tackle in use.

FIG. 2 is a view of the fishing tackle in side elevation.

FIG. 3 is a bottom plan view of the article.

FIG. 4 is a vertical sectional view taken on line 4—4 of FIG. 3.

FIG. 5 is a vertical sectional view illustrating the parts in disassembled relation and taken on line 5—5 of FIG. 3.

FIG. 6 is an inner end view of the upper part of the device as viewed on line 6—6 of FIG. 5.

FIG. 7 is an inner top view of the bottom section of the device as viewed on line 7—7 of FIG. 5.

Referring to the drawing which illustrates the preferred embodiment of the invention, the numeral 10 designates the body of the device. The body 10 is molded from synthetic resin material of any suitable type, and is of any size desired and found suitable for its intended use. The body is formed of an upper part 12 and a lower part 14. The parts 12 and 14 are cast or molded separately and may be formed of similar materials or of different materials.

The top part 12 has a concavo-convex outer wall 16 of rounded, dome-like or substantially semi-spherical outline or configuration, although the central portion thereof at 18 may be substantially flat. A concentric tubular inner wall 20 is formed integrally with outer wall 16. The lowermost edges of walls 16 and 20 preferably lie in a common parting plane 22. The inner surface of outer wall 16 is preferably provided with a circumferential groove 24 adjacent and parallel to the plane 22 but spaced therefrom to define an annular rib 26. The outer surface of tubular wall 20 is preferably provided with a circumferential groove 28 which may be complementary to groove 24 and which defines an annular rib 30, preferably coplanar with rib 26 and concentric therewith. Wall 20 outlines an inverted cup-shaped cavity, recess or pocket located centrally within the body and an outer annular chamber or recess in the body. An aperture 32 of a size adapted to slidably receive a fishing line is formed in the central wall portion 18 and communicates with the central inverted pocket or chamber.

The lower body part 14 comprises an open-ended tubular wall portion 34 from which project radially outwardly a plurality of integral longitudinally extending ribs 36. An annular top wall 38 projects outwardly from and is formed integrally with one end of tubular wall 34 and with the longitudinal ribs 36. The inner diameter of at least the upper end of tubular wall 34 is preferably the same as the inner diameter of the tubular inner wall 20 of the upper part 12, and the outer diameter of the annular top wall 38 is preferably the same as the outer diameter of the open end of the convex outer wall 16 of the top part 12. An annular locking ring or rib part 40 is formed integrally with and projects upwardly from the top wall 38 in concentric relation thereto.

Annular locking part 40 is preferably provided with an inwardly and downwardly tapering or frustoconical outer surface 42, and with an outwardly and downwardly frustoconical inner surface 44. The width of the annular locking part 40 at its uppermost surface is slightly greater than the spacing between the ribs 26 and 30 of the upper part, and preferably slightly less than the maximum spacing between the grooves 24 and 28 of the upper part. The arrangement is such that the two parts may be interlocked by a snap fit of annular locking part 40 in the mouth of the annular outer chamber of the upper part, as illustrated in FIG. 4.

It will be understood, however, that a snap lock fit of the parts is not required, and that part 40 may have substantially cylindrical inner and outer walls to constitute a pilot part fitting into the mouth of the outer annular recess or chamber of the upper part to accurately register the upper and lower body parts. The body parts may be adhered in assembled relation by cement, or may be bonded together by the use of a suitable bonding agent.

The assembled parts 12, 14 provide a body 10 of suitable or desired configuration, preferably rounded at its upper part and tapering inwardly and downwardly at the outer surfaces of the ribs 36.

The ribs 36 are preferably similar in configuration and equally spaced circumferentially, with their longitudinal side walls extending substantially radially. The grooves 46 formed between the ribs 36 are of substantially uniform width throughout their length, as seen in FIGS. 2 and 3. The ribs 36 are preferably of greater width than the width of the intervening grooves 46, and are of any selected dimension to provide the desired mass or weight of lower body part 14 and to ensure that the weight of the lower body part 14 will be greater than the weight of the upper body part 12.

The assembled body is buoyant, as ensured by the sealed annular chamber 48 defined by walls 16 and 20 of the upper body part 12 and the top wall 38 of the lower body part 14, and by the cement or bonding material joining the two parts. The chambered part 12 may be reinforced and strengthened by integral radial internal ribs 50, best seen in FIG. 6, whose lowermost surfaces terminate in a plane spaced from the parting plane 22 a distance greater than the height or vertical dimension of the annular locking part 40 of the lower body part.

The upper face of the annular locking part 40 may be provided with a plurality of recesses 52 registering and centered with the respective ribs 36, and resulting from shrinkage of the plastic at thick wall rib portions as the plastic sets. Such recesses 52 are not detrimental if they are spaced from the inner and outer walls of locking part 40.

In the use of the device a line 54 is passed through the aperture 32 and a sinker 56 and a hook 58 are attached to the line. A slip knot 60 is tied to the line 54 above the body 10 as a means for regulating the depth at which the hook 58 is positioned in the water when suspended from the body 10. The hook employed is preferably of a dimension small enough to enter the pocket in the body defined by tubular walls 20–34. This is of substantial advantage during casting in that it limits the risk of catching or fouling of the hook as the fishing tackle is being cast. It will be understood that the location of the sinker 56 may be changed from that shown in FIG. 1 to a position closer to the hook 58 in order to accommodate reception of the hook within the pocket of the body during casting.

The arrangement illustrated in FIG. 1 may be altered for still fishing by applying a second slip knot (not shown) to the line 54 to be located within the pocket of the body and to cooperate with the knot 60 exterior of the body and to cooperate with the knot 60 exterior of the body to limit movement of the hook relative to the body as the body floats on the water.

The part 12 of the body which is normally visible during fishing as the body floats on the water preferably has a distinctive readily visible appearance. One means contemplated to provide this appearance is the use, in the resin of which the body part 12 is formed, or the application to the exterior of the body part 12, of daylight fluorescent coloring material. Such coloring material can be incorporated during the molding process or applied to the part 12 separately before assembly of the body, and thus the body will have the desired appearance upon assembly of its parts.

My new unit can be used for spin-casting, casting with a conventional reel, for fishing with a cane pole, or for ice fishing. No metal clips, springs or wire hooks which can cut or weaken a line are required. Likewise, the provision of the pocket or recess avoids snagging or hooking of weeds or other obstacles when casting or when reeling in, and serves to protect both the hook and any bait (not shown) attached to the hook. Another characteristic of the device is that it may be used with lines of different types and thicknesses, inasmuch as the aperture 32 in the wall 18 is readily enlarged by a tool, such as a safety pin. The plastic of which the body is formed renders it tough and durable, and the sealed chamber within the upper part of the body and the weighted character of the ribbed lower part of the body ensure that the body will always ride properly in the water for visibility of its distinctively colored upper body portion 12 so that a fisherman can be assured of vision of the body, even at some distance, until such time as a strike by a fish results in complete immersion of the body.

While the preferred embodiment of this invention has been illustrated and described, it will be understood that changes may be made within the scope of the appended claims without departing from the spirit of the invention.

What I claim is:

1. Fishing tackle comprising a buoyant body formed of upper and lower molded parts secured together, said upper part having a concavo-convex outer wall terminating at a transverse circular edge and an integral concentric cylindrical wall having a transverse circular edge substantially at the plane of said outer wall edge, said lower part having an open-ended cylindrical wall, an outwardly projecting top wall and longitudinal outer ribs, means securing said top wall to the annular edges of said outer and cylindrical walls of said upper part to define a sealed annular chamber in said upper part and a central pocket in said body open at its lower end, said outer wall of said upper part having a line-receiving opening formed therein and communicating with said pocket.

2. Fishing tackle as defined in claim 1, wherein a ring projects from the top wall of said lower part and fits between the outer wall and the tubular inner wall of said upper part.

3. Fishing tackle as defined in claim 2, and interfitting snap lock means carried by said interfitting ring and top part.

4. Fishing tackle as defined in claim 2, wherein interfitting annular snap locking tongue and groove means are formed on the inner and outer sides of said ring of said lower part and on the walls of said upper part engaged by said ring. a 5. Fishing tackle as defined in claim 1, and a plurality of substantially radial ribs spanning the sealed annular chamber.

6. Fishing tackle as defined in claim 1, wherein said pocket is of substantially uniform dimension throughout its length and said longitudinal ribs of said lower part have a streamlined reduced tapered outline defining a smooth continuation of the outer surface of the outer wall of said upper part.

7. Fishing tackle as defined in claim 1, wherein the upper body part has a distinctive readily visible coloration.

* * * * *